No. 888,506. PATENTED MAY 26, 1908.
M. KELLOW.
TURBINE DRIVEN ROCK DRILL.
APPLICATION FILED NOV. 9, 1906.
6 SHEETS—SHEET 2.
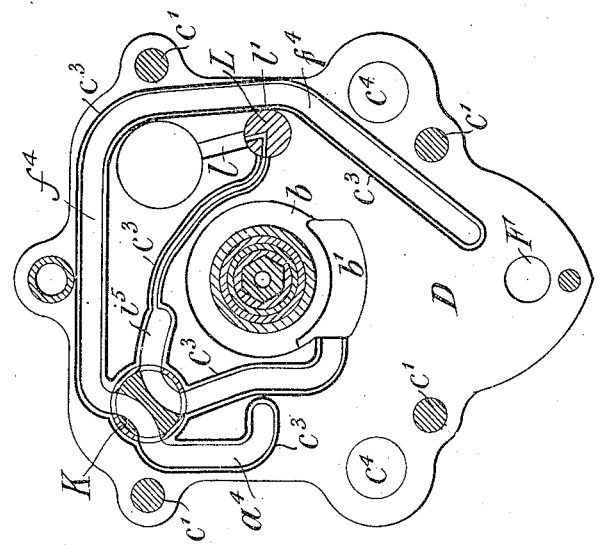
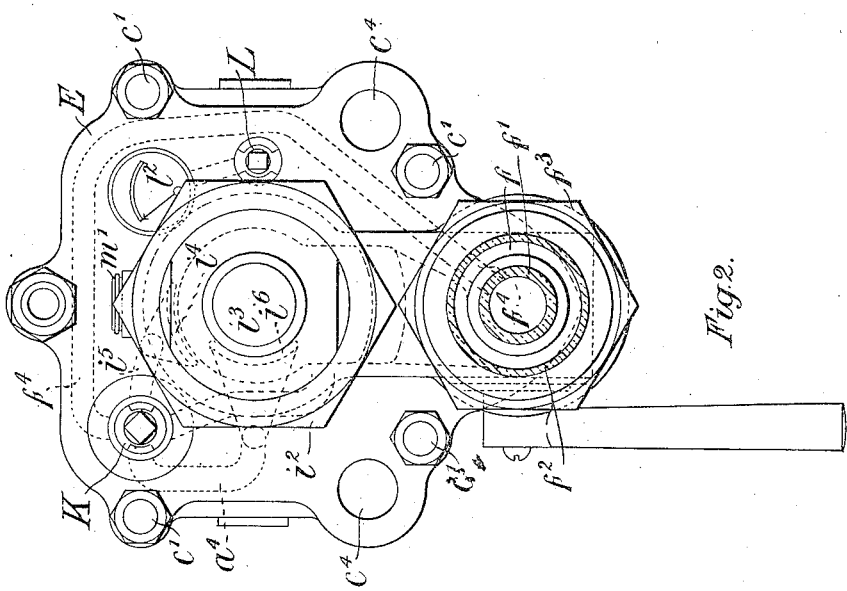
WITNESSES: INVENTOR:

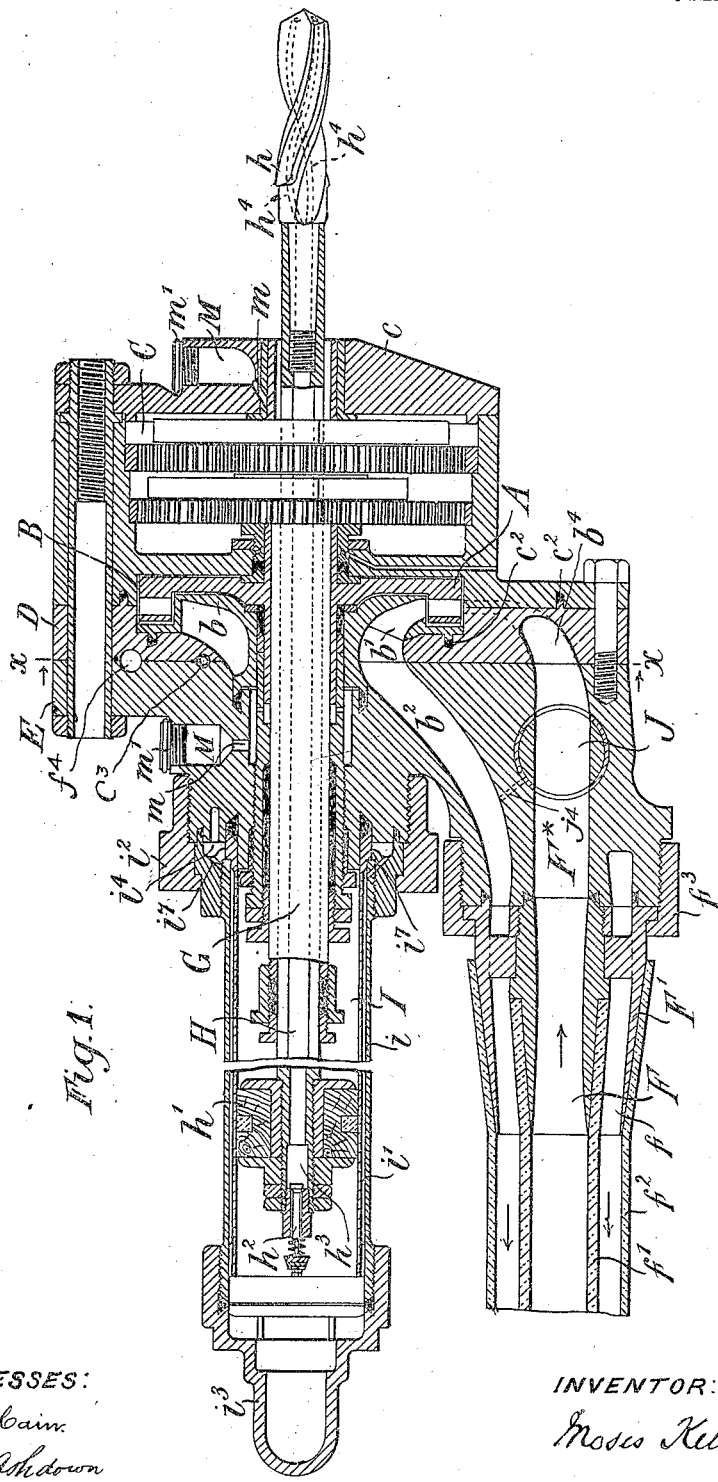

No. 888,506. PATENTED MAY 26, 1908.
M. KELLOW.
TURBINE DRIVEN ROCK DRILL.
APPLICATION FILED NOV. 9, 1906.
6 SHEETS—SHEET 3.
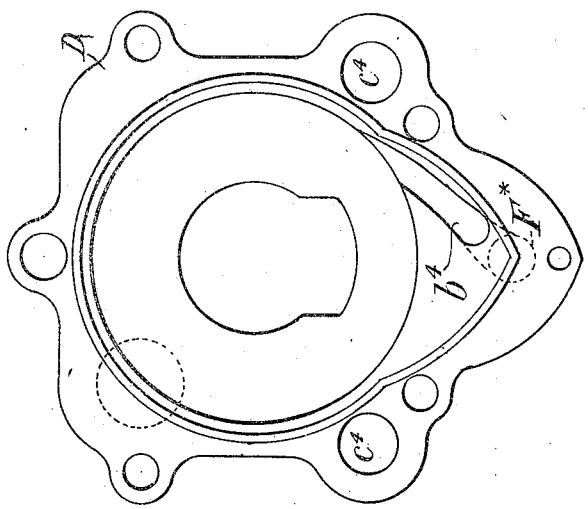
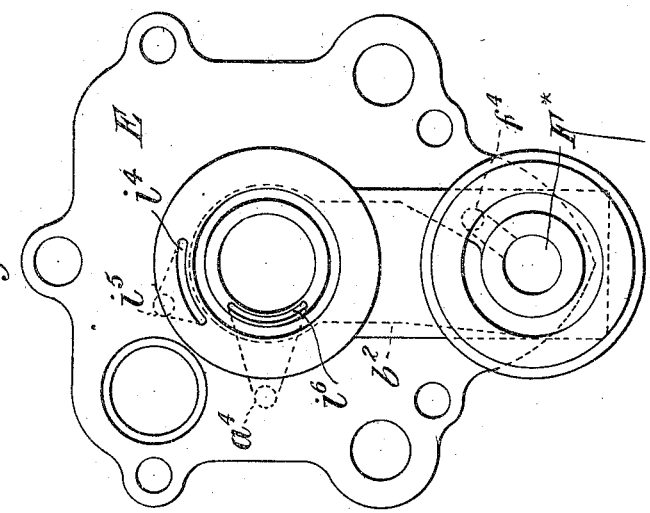
WITNESSES:
W. F. Cain.
C. J. Ashdown.
INVENTOR:
Moses Kellow No. 888,506.

PATENTED MAY 26, 1908.

M. KELLOW.
TURBINE DRIVEN ROCK DRILL.
APPLICATION FILED NOV. 9, 1906.

6 SHEETS—SHEET 4.

WITNESSES:
W. F. Cain.
C. J. Ashdown.

INVENTOR:
Moses Kellow

No. 888,506. PATENTED MAY 26, 1908.
M. KELLOW.
TURBINE DRIVEN ROCK DRILL.
APPLICATION FILED NOV. 9, 1906.

6 SHEETS—SHEET 5.

WITNESSES:
W. F. Cain.
C. J. Ashdown.

INVENTOR:
Moses Kellow

No. 888,506. PATENTED MAY 26, 1908.
M. KELLOW.
TURBINE DRIVEN ROCK DRILL.
APPLICATION FILED NOV. 9, 1906.

6 SHEETS—SHEET 6.

WITNESSES:
C. J. Ashdown
W. F. Cain.

INVENTOR:
Moses Kellow

UNITED STATES PATENT OFFICE.

MOSES KELLOW, OF PENRHYNDENDRAETH, ENGLAND.

TURBINE-DRIVEN ROCK-DRILL.

No. 888,506.   Specification of Letters Patent.   Patented May 26, 1908.

Application filed November 9, 1906. Serial No. 342,686.

*To all whom it may concern:*

Be it known that I, MOSES KELLOW, of the Park and Croesor Quarries, Penrhyndendraeth, in the county of Merioneth, England, a subject of the King of Great Britain and Ireland, have invented certain new and useful Improvements in Turbine-Driven Rock-Drills, of which the following is a specification.

This invention relates to rock-drills of the type wherein a turbine or other small motor, is employed for rotating the drill.

The present invention consists in certain improvements in power drills of this class; particularly in the construction and mounting of the turbine-wheel, and in the construction of the casing part of which improvements forms the subject of a divisional application filed 1st April, 1907, Serial No. 365,798.

Figure 6:
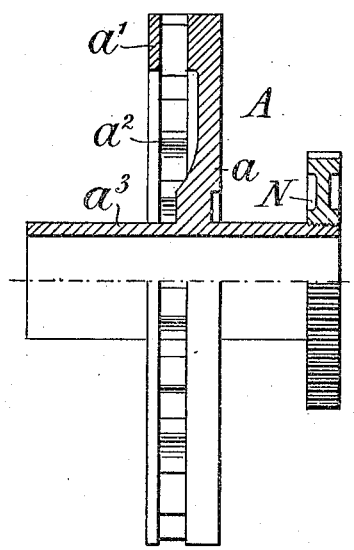
Figure 7:
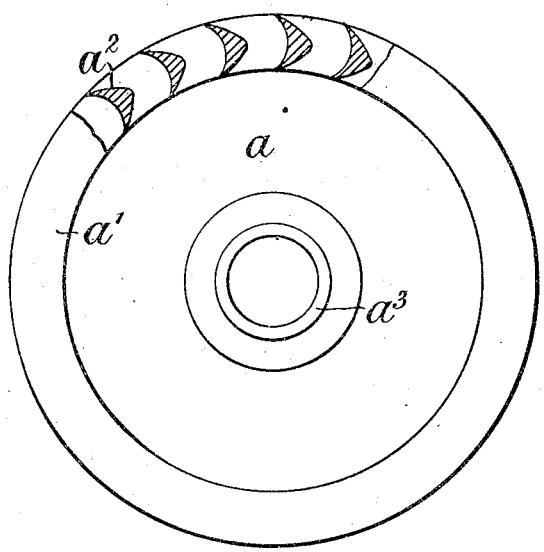
Figure 8:
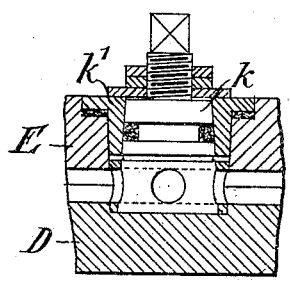
Figure 10:
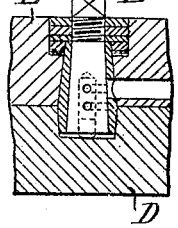
Figure 11:
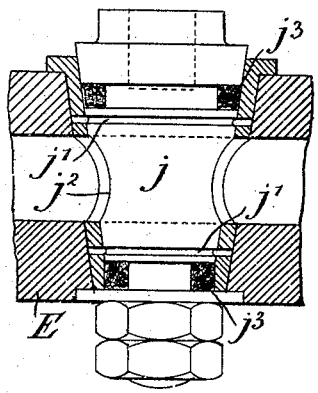
Figure 9:
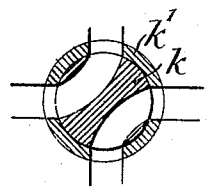
Figure 12:
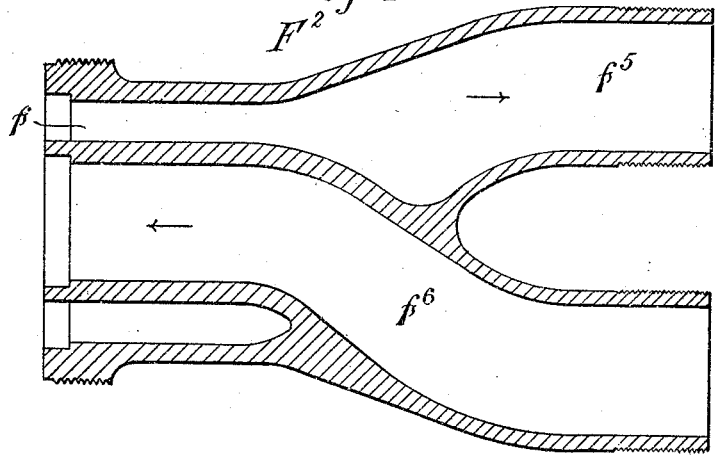
Figure 13:
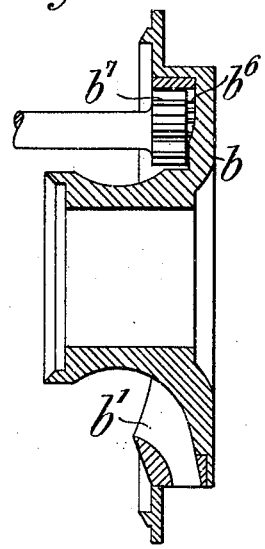
Figure 14:
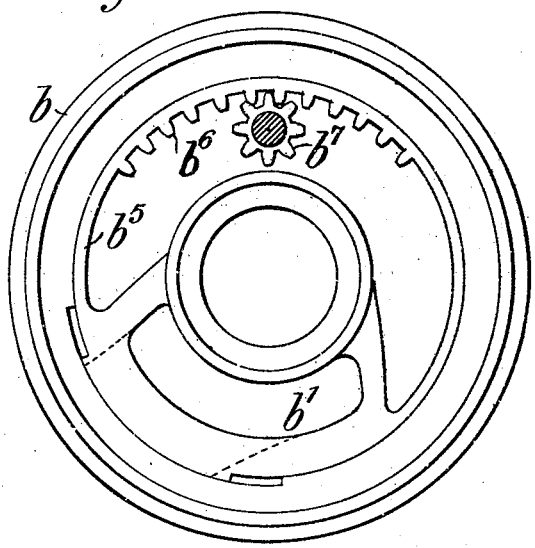
Figure 15:
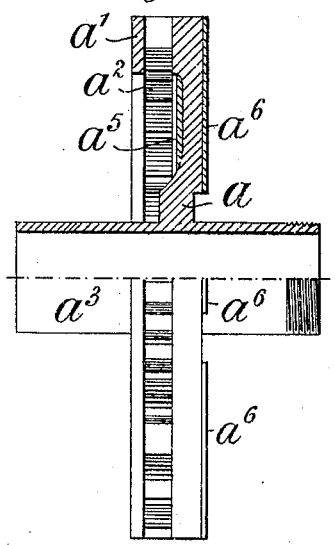
Figure 16:
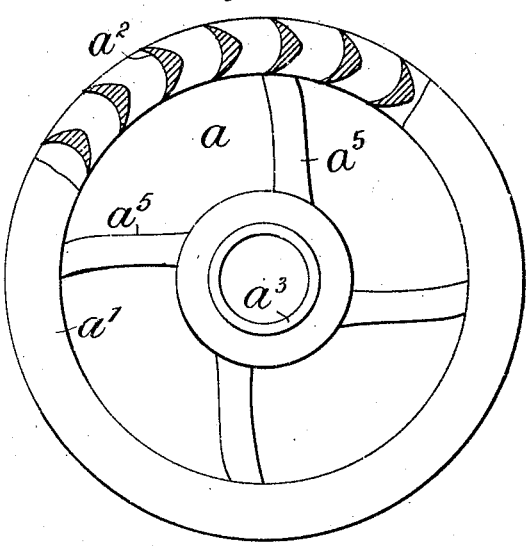

In the accompanying drawings, which illustrate a turbine-driven rock-drill embodying my improvements, Figure 1 is a longitudinal section of the machine, Fig. 2 a view of the rear end thereof, and Fig. 3 a vertical section looking in the direction of the arrows on the line $x$—$x$ in Fig. 1 showing the water-passages for supplying water to the opposite sides of the piston in the piston cylinder. Fig. 4 is a view of the opposite face of the plate shown in Fig. 3, while Fig. 5 is a face view of the rear plate. Fig. 6 is a side elevation, partly in section, and Fig. 7 a face-view, also partly in section, illustrating the turbine-wheel. Fig. 8 is a vertical section and Fig. 9 a transverse section illustrating the four-way cock for distributing the water to different parts of the machine. Fig. 10 is a vertical section illustrating a two-way cock hereinafter more particularly referred to, and Fig. 11 a similar view illustrating the main-supply cock. Fig. 12 illustrates in transverse section a breeches-pipe hereinafter more particularly referred to. Fig. 13 is a vertical section and Fig. 14 a face view, illustrating means for adjusting the discharge-nozzle upon the turbine casing. Fig. 15 is a side elevation, partly in section, and Fig. 16 a face view of a modified construction of turbine.

According to my improved method of construction, the turbine-wheel A comprises an annular disk $a$ formed at its periphery with a laterally projecting flange $a'$ wherein a number of curved vanes $a^2$ are mounted. These vanes radiate from the center of the wheel and are mounted in the flange $a'$ with their outer and inner extremities respectively flush with the outer and inner surfaces of the said flange and arranged in such a manner that the angle of outflow is comparatively large. This turbine is housed in a chamber B formed as to one side by the wall of the gear-chamber C and as to the other side by a cover $b$ attached to a plate D which is placed between the gear-case C and a rear-plate E, the latter carrying the main water-supply-nozzle F hereinafter described. The turbine A is housed within its chamber B with just sufficient clearance to permit of its free working; and the water, after impinging upon the vanes $a^2$, flows through a passage $b'$ formed in the cover $b$ of the wheel-chamber; and thence into the discharge-passage $b^2$ in the casing. The passage $b'$ through which the water is discharged from the wheel-chamber B is formed with outwardly diverging sides, as shown in Fig. 1; the effect being that, the unexhausted kinetic energy in the water flowing from the turbine due to the large angle of outflow of the vanes is converted into pressure while passing through the discharge-passage $b^2$ which gradually increases in area, as shown in Fig. 1. The pressure so formed can be used to force the discharge through a pipe of small diameter, and, if necessary, against an adverse head. The principal features for enabling the apparatus to discharge against an adverse head are, firstly, the delivering angle of the vane in relation to its path; secondly, the form of the turbine-wheel, which enables the water to be discharged from the vanes directly into the passage $b^2$ without coming into contact with the body of the wheel; and thirdly, the divergent form of the passage $b^2$. When the head of water is constant and the speed of the wheel variable, the position of the discharge will also be variable. This variation may, within narrow limits, be provided for by making the discharge-passage $b'$ in the chamber-cover $b$ slightly wider than the stream it has to receive. Where, however, the variations of speed are not confined within narrow limits, the discharge-nozzle $b'$ is preferably attached as shown in Figs. 13 and 14 to a ring $b^5$ capable of being rotated within the cover $b$ by means of a rack $b^6$ and pinion $b^7$. In this manner the nozzle may be adjusted to receive the water at any required point.

For working at a high efficiency it is indispensable that the turbine wheel should not be immersed in water; this is accomplished partly by the effect of centrifugal action, the turbine wheel revolving at a high speed within the closed chamber B with only sufficient clearance to permit of the free working of the turbine. A small quantity of water only enters between the disk $a$ and the walls of the chamber, and when the apparatus is in operation this water is readily displaced by reason of the centrifugal action set up by the turbine. Accumulation of water at the sides of the wheel may also be prevented by providing the sides of the disk with vanes $a^5$ $a^6$ (Figs 15 and 16), similar to those employed in centrifugal pumps; these vanes serving to force the water into the discharge-pipe.

The turbine A is mounted on or formed with a sleeve $a^3$ adapted to rotate freely upon a casing G which partially incloses a drill-tube H of hexagonal form. This tube is furnished at its outer extremity with a drill $h$, while its inner extremity is furnished with a piston $h'$, preferably of hard wood, which works in a cylinder I arranged concentrically within an outer cylinder $i$; the latter forming an annular passage $i'$ around the inner cylinder. With the aid of a suitable nut $i^2$ these cylinders are attached at their one end to the rear-plate E of the casing, while their opposite ends are closed by a suitably formed cap $i^3$. Water under pressure is admitted by way of the passage $f^4$ and the cock K to the annular passage $i'$ between the cylinders or to the interior of the cylinder I, according to whether it is desired to advance or to withdraw the drill. For withdrawing the drill the cock K is placed in the position shown in Fig. 3, communication being effected between the passages $f^4$ and $a^4$, and between the passages $c^3$ and $i^5$. In this position of the cock the water flows from the passage $a'$ to a passage $i^6$ in the face of the rear-plate E (see Figs. 2 and 4) and thence passes into the cylinder I at the front of the piston $h'$. When it is desired to advance the drill the cock K is turned so that the passage $f^4$ is placed in communication with the passage $i^5$, and the passage $a^4$ in communication with the passage $c^3$; water will now flow from the passage $i^5$ into a passage $i^4$ in the face of the rear plate (see Figs. 1, 2 and 4) and thence by way of passages $i^7$ and the annular passage $i'$ to the rear of the piston $h'$.

At the piston-end of the drill-tube H is mounted a spring-supported valve $h^2$ adapted to admit water to an axial passage $h^3$ in the drill-tube, whence it passes by way of passages $h^4$ in the drill to the extremity of the latter. The spring pertaining to the valve $h^2$ is adjusted to permit of the latter opening at the pressure required for advancing the drill when boring; the said valve closing and shutting off the water supply to the drill when the latter is not working.

For supplying water to the casing to operate the drill and for subsequently discharging the same, I employ two concentric nozzles F F' attached to the rear-plate E. The inner nozzle F serves to convey the water to the casing, while the outer nozzle F', which forms an annular passage $f$ about the inner nozzle, serves as the outlet from the casing. To these nozzles hose pipes $f'$ $f^2$ are respectively connected for the supply and discharge of the water, the nozzles being connected together by means of concentric unions capable of being tightened by a single nut $f^3$. The other ends of the hose-pipes are attached in a similar manner to a breeches-pipe F² (see Fig. 12), so constructed that the discharge-passage $f$ changes from the annular form and position concentric with the inlet at one end to a cylindrical pipe $f^5$ forming one leg, while the inlet $f^6$ is formed by the other leg, thus enabling the water to be conveyed to and away from the hose-pipes by means of separate pipes.

The supply of water to drive the turbine is controlled, independently of the supply which passes to the drill-piston, by means of a plug-cock J arranged in the inlet-passage F* in the rear-plate E, and adapted to open or close communication between the passage F* and a passage $b^4$ (see Fig. 4) which serves as a nozzle through which the water passes to drive the turbine. The plug $j$ of the cock is formed with a groove $j'$ on either side of the transverse water-passage $j^2$ (see Fig. 11), and these grooves communicate, through suitable water-passages $j^4$, with the discharge from the machine, leakage between the plug and its shell being by these means minimized; suitable packings $j^3$ being also provided with a view to rendering the cock water-tight. The four-way cock K, for admitting water to the cylinder I and the annular passage $i$, is formed with a plug $k$ tapered toward its spindle (see Fig. 8) instead of in the reverse direction, as is common in plug-cocks, to facilitate its adjustment and to take up wear; the shell $k'$ within which the plug $k$ is housed being tapered to correspond on the inside but in the reverse way on the outside. The passages for conveying the water to and from the four-way cock are formed in the castings from which the casing is built up, the passages being by preference formed in the faces of contiguous castings; so that when these are jointed together, complete passages are formed. Passages $l$, $l'$ also communicate through the intervention of a cock L between the main-supply-passage $f^4$ and a pressure-gage $l^2$ which is inclosed within the casing and serves to indicate the pressure of the water either in the passages $f^4$ or at the rear of the piston $h'$.

It will be seen that the casing comprises three main castings, a front piece C which incloses the driving-gear and a portion of the turbine-wheel, an intermediate piece D which incloses the remainder of the turbine, and a rear-piece E which carries the supply- and discharge-nozzles and the concentric cylinders before referred to. The front piece C is furnished with a cover-plate c preferably of considerable thickness. The whole are secured together by bolts c' which pass through the several castings; suitable joints being formed by means of packing c² to render the complete casing water-tight, packings c³ being also provided on either side of the water-passages. Holes c⁴ are also provided in the casing for securing the latter to rods which support the machine when at work. The casing is further provided with suitably arranged lubricator cups M and with passages m through which the working parts may be lubricated; these cups being closed by screw-caps m'.

What I claim as my invention and desire to secure by Letters Patent, is:—

1. In a turbine-driven rock-drill, the herein described means for discharging the exhaust water at a higher level or otherwise against an adverse pressure; same comprising a turbine-wheel of the kind herein referred to and having its vanes arranged to permit of a large angle of outflow; a casing having a chamber for said turbine, and a discharge passage which gradually increases in area towards the outlet and which receives the water on leaving the vanes of said turbine, substantially as set forth.

2. In a rotary rock-drill, a turbine wheel formed with a laterally projecting peripheral flange, curved vanes radially mounted in said flange, vanes on opposite faces of the body of the said turbine wheel, and a casing having a chamber for said turbine and a discharge passage which gradually increases in area towards its outlet, substantially as set forth.

3. In a rotary rock-drill of the kind herein referred to, a casing built up of three parts; a front part forming the gear case, an intermediate part forming with the gear case the turbine-chamber and a rear part formed with inlet and outlet passages, substantially as herein described.

4. In a turbine-driven rock-drill, the combination, with the turbine and a casing for said turbine, of concentrically arranged inlet and outlet nozzles to which are respectively connected concentrically arranged supply and discharge pipes, substantially as herein described.

5. In a turbine-driven rock-drill, the combination, with a casing having supply and discharge passages, of a main-supply-cock comprising a plug formed with an annular groove on either side of the main passage, said grooves communicating with the discharge passage in said casing, substantially as herein described.

6. In a turbine-driven rock-drill, the combination, with a casing having supply and discharge passages, of a cock comprising a plug formed with an outwardly converging taper and with an annular groove which communicates with the discharge passage in said casing, and a casing formed as to its inner face to correspond with said plug and as to its outer face with an inwardly converging taper.

In testimony whereof I have signed my name to this specification in the presence of two subscribing witnesses

MOSES KELLOW.

Witnesses:
A. NUTTING,
C. P. LIDDON.